(12) United States Patent
Berger et al.

(10) Patent No.: US 11,924,622 B2
(45) Date of Patent: Mar. 5, 2024

(54) CENTRALIZED PROCESSING OF AN INCOMING AUDIO STREAM

(71) Applicant: SAGEMCOM BROADBAND SAS, Rueil Malmaison (FR)

(72) Inventors: Jérôme Berger, Rueil Malmaison (FR); Gabriel Bouvigne, Rueil Malmaison (FR); Stéphane Delplace, Rueil Malmaison (FR); Frédéric Sodi, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 174 days.

(21) Appl. No.: 17/337,128

(22) Filed: Jun. 2, 2021

(65) Prior Publication Data

US 2021/0377687 A1    Dec. 2, 2021

(30) Foreign Application Priority Data

Jun. 2, 2020    (FR) ...................................... 20 05773

(51) Int. Cl.
*H04S 7/00*    (2006.01)
*G06F 3/16*    (2006.01)

(52) U.S. Cl.
CPC ............... *H04S 7/30* (2013.01); *G06F 3/165* (2013.01); *H04S 2400/01* (2013.01); *H04S 2400/13* (2013.01)

(58) Field of Classification Search
CPC .... H04S 7/30; H04S 2400/01; H04S 2400/13; G06F 3/165
See application file for complete search history.

(56) References Cited

U.S. PATENT DOCUMENTS

| 9,763,280 B1 | 9/2017 | Allen et al. |
| 2005/0190928 A1 | 9/2005 | Noto |
| 2016/0212534 A1 | 7/2016 | Le Nerriec et al. |

FOREIGN PATENT DOCUMENTS

| CN | 112073890 A | * | 12/2020 | ............. H04S 1/007 |
| EP | 3787318 A1 | * | 3/2021 | ............... H04R 3/12 |
| WO | WO-2012172480 A2 | * | 12/2012 | ............... H04R 3/12 |
| WO | WO-2019208012 A1 | * | 10/2019 | ............... H04R 3/12 |
| WO | WO-2020182020 A1 | * | 9/2020 | |

* cited by examiner

*Primary Examiner* — David L Ton
(74) *Attorney, Agent, or Firm* — MUNCY, GEISSLER, OLDS & LOWE, P.C.

(57) ABSTRACT

A processor device for processing an incoming audio stream, the device including: a configuration element arranged to acquire input parameters having both first characteristics of the incoming audio stream and also second characteristics of the audio playback devices, and to produce configuration parameters on the basis of the input parameters; a master element arranged to define processing sequences from the configuration parameters, each processing sequence being associated with and adapted to a respective playback channel, to apply the processing sequences to the incoming audio stream so as to produce processed audio streams, each adapted to a respective one of the playback channels, and to transmit to each piece of equipment including an audio playback device the processed audio stream is adapted to the playback channel associated with the audio playback device.

16 Claims, 6 Drawing Sheets

CENTRALIZED PROCESSING OF AN INCOMING AUDIO STREAM

The invention relates to the field of home multimedia installations.

BACKGROUND OF THE INVENTION

Modern home multimedia installations commonly include various types of equipment incorporating one or more audio playback devices each having a loudspeaker.

By way of example, such equipment may comprise amplified speakers capable of receiving audio streams via network protocols. These speakers may be smartspeakers (i.e. independent network-connected speakers) that possess advanced internal processing capabilities, but sometimes they may be speakers that are simpler, such as, for example, Bluetooth speakers that are to be controlled by some other piece of equipment, e.g. such as a smartphone.

Nowadays there exist numerous possibilities serving to improve the sound playback of an audio system incorporating such speakers.

Thus, some such speakers offer the possibility of being grouped together within the same room in order to improve the listening experience of the user, in particular by means of multichannel sound playback.

When a plurality of speakers are incorporated within the same sound group, it can be desirable to modify the way each of them renders sound individually in order to take advantage of the fact that a plurality of speakers are being used simultaneously. For example, proposals have been made to enable speakers to apply different equalization parameters when they are used on their own or when they are incorporated in a group. Naturally, this assumes that the speakers have the processing capability needed for applying the appropriate processing when they are grouped together, and thus considerable computing power. When this type of speaker is used in isolation, that computing power is often unused, or is used to a more limited extent. For example, when a speaker is used on its own, it frequently happens that it does not make use of equalization or that it uses equalization that is simplified, whereas the same model speaker applies equalization that is more complex to the signal when it is grouped in a pair of speakers, e.g. in order to distribute the rendering of low frequencies differently or in order to perform down-mixing that is more complex.

Likewise, some speakers are capable of applying spatialization effects (i.e. 3D audio effects), which are logically absent when the speaker is used on its own. Under such circumstances, when a speaker receiving a stereo audio stream is being used on its own, it merely performs mono down-mixing, whereas when a pair of speakers are grouped together, they may optionally apply complex processing in order to modify the spatialization.

However, equipment that incorporates one or more audio playback devices need not necessarily be a speaker. Thus, the decoder boxes (or "set-top" boxes) present in users' homes are progressively being enhanced with advanced audio functions, e.g. including both the ability to reproduce sound directly by means of loudspeakers incorporated in the decoder box, and also the ability to control speakers that are connected via wireless connections. The speakers in question must naturally be designed for that type of use and must the incorporate processing capabilities needed for correct reproduction of multichannel environments as encountered in such configurations.

All of the above-described processing thus implies using speakers that need to be specially designed in order to perform that processing. A user who already possesses speakers therefore needs to replace those speakers with new speakers in order to benefit from that processing and the improvement in sound playback. Such recent speakers need to possess significant computing capabilities and they are therefore expensive.

Furthermore, as mentioned above, the computing power of such recent speakers is often largely unused when those speakers are used on their own, such that the increased price of the speaker is then no longer justified.

OBJECT OF THE INVENTION

An object of the invention is to improve sound playback in an audio system comprising a plurality of pieces of equipment, without increasing the cost of the audio system and without preconditions on the design of those pieces of equipment.

SUMMARY OF THE INVENTION

In order to achieve this object, there is provided a processor device for processing an incoming audio stream, the device being arranged to be incorporated in an audio system comprising a plurality of pieces of equipment incorporating audio playback devices, each having a loudspeaker, the audio playback devices being arranged to form a plurality of playback channels, and the processor device comprising:
  a configuration element arranged to acquire input parameters comprising both first characteristics of the incoming audio stream and also second characteristics of the audio playback devices, and to produce configuration parameters on the basis of the input parameters;
  a master element arranged to acquire the incoming audio stream together with the configuration parameters, to define processing sequences from the configuration parameters, each processing sequence being associated with and adapted to a respective playback channel, to apply the processing sequences to the incoming audio stream so as to produce processed audio streams, each adapted to a respective one of the playback channels and defining spatialization, and to transmit to each piece of equipment including an audio playback device the processed audio stream that is adapted to the playback channel associated with said audio playback device, the processed audio streams being configured by the master element so as to ensure that the pieces of equipment that receive the processed audio streams from the master element cannot perform processing that could mix said processed audio streams or that could modify the spatialization.

The processor device of the invention enables processing sequences (equalization, effects, channel distribution, etc.) to be applied to the incoming audio stream in such a manner as to produce processed audio streams, each of which is adapted to a respective one of the playback channels. This significantly improves the sound playback of the audio system. The processed audio streams are thus generated and played back by the pieces of equipment even though it is not necessary for all of the pieces of equipment (other than the equipment incorporating the master element and the configuration element) to have been designed initially for applying such processing.

The master element is in charge of all of the computation needed to transform the incoming audio stream into a plurality of processed audio streams that are sent for playback by the pieces of equipment (which are generally speakers) that incorporate the audio playback devices, without there being any need for said pieces of equipment to modify the incoming audio stream themselves.

Thus, it is possible to use less expensive speakers in advanced special configurations, and to be able to upgrade an audio system, it being possible to use speakers in configurations that were not known at the time of their initial development.

There is also provided a processor device as described above, wherein configuring each processed audio stream consists in associating it with a specific message or with a dedicated command.

There is also provided a processor device as described above, wherein configuring each processed audio stream consists in transmitting it in mono mode.

There is also provided a processor device as described above, wherein configuring each processed audio stream consists in transmitting it in dual channel mode.

There is also provided a processor device as described above, wherein configuring each processed audio stream consists in transmitting it in stereo mode, with two channels conveying the same audio signal.

There is also provided a processor device as described above, wherein the processing sequence associated with and adapted to a playback channel performs processing that comprises creating a particular audio stream adapted to said playback channel, and/or applying equalization and/or dynamic gain adjustment and/or relative volume adjustment to that particular audio stream in order to produce the processed audio stream adapted to said playback channel.

There is also provided a processor device as described above, wherein the first characteristics of the incoming audio stream comprise the number of source channels of the incoming audio stream and a spatial configuration of the incoming audio stream.

There is also provided a processor device as described above, wherein the second characteristics of the audio playback devices comprise playback information about the acoustic capabilities of the audio playback devices and about the spatial configuration of the playback channels.

There is also provided a processor device as described above, wherein the playback information is acquired by the configuration element via an application programming interface co-operating with a pre-filled database, or by receiving dedicated messages issued by the pieces of equipment incorporating said audio playback devices, or else transmitted to the configuration element by the master element.

There is also provided equipment including a processor device as described above.

There is also provided equipment as described above, the equipment being a decoder box.

There is also provided an audio system comprising a plurality of pieces of equipment incorporating audio playback devices, each including a loudspeaker, the audio system including a processor device as described above, which device is implemented by at least two distinct pieces of equipment.

There is also provided an audio system as described above, wherein the at least two distinct pieces of equipment comprise master equipment in which the master element is implemented and configuration equipment in which the configuration element is implemented.

There is also provided an audio system as described above, wherein the at least two distinct pieces of equipment comprise at least two master pieces of equipment, with a respective master element being implemented in each of them.

There is also provided a processing method implemented in a processor device as described above, and comprising the steps of:
acquiring input parameters comprising both first characteristics of the incoming audio stream and also second characteristics of the audio playback devices, and producing configuration parameters on the basis of the input parameters;
acquiring the incoming audio stream together with the configuration parameters, defining processing sequences from the configuration parameters, each processing sequence being associated with and adapted to a respective playback channel, applying the processing sequences to the incoming audio stream so as to produce processed audio streams, each adapted to a respective one of the playback channels, and transmitting to each piece of equipment including an audio playback device the processed audio stream that is adapted to the playback channel associated with said audio playback device.

There is also provided a computer program including instructions that cause the processor device as described above to execute the steps of the processing method as described above.

There is also provided a computer readable storage medium, storing the above-described computer program.

The invention can be better understood in the light of the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

The description begins with the general principle of the invention.

An audio system in which the invention is implemented comprises a plurality of pieces of equipment including respective audio playback devices. The term "audio playback device" is used to mean a loudspeaker and signal-shaping means for shaping an audio signal that is applied to said loudspeaker for playback (which signal-shaping means may be common to a plurality of audio playback devices within a single piece of equipment). The audio playback devices are incorporated in the plurality of pieces of equipment: there is no need for all of the pieces of equipment in the audio system to include a respective audio playback device, and it is also possible for some pieces of equipment to include two or more such devices.

The audio playback devices of the audio system are arranged to form a plurality of playback channels (spatial channels).

The audio system incorporates a processor device comprising a master element and a configuration element. The processor device is provided in one or more of the pieces of equipment of the audio system.

The master element acquires an incoming audio stream, which may come from any source: a "cloud" service, a local network, a broadcast, etc.

The configuration element informs the master element about the sound reproduction configuration and/or the acoustic characteristics of the pieces of equipment that include audio playback devices (and thus the loudspeakers).

The master element applies the computation and the processing necessary for obtaining processed audio streams, each adapted to a respective playback channel. The master element thus produces n processed audio streams for n playback channels. The master element transmits to each piece of equipment that includes an audio playback device the processed audio stream that is adapted to the playback channel to which said audio playback device belongs. Each piece of equipment then reproduces its dedicated processed audio stream(s), without applying any additional processing thereto.

The master element may be situated in various entities, e.g. in a streaming service that is situated in the "cloud", or else in one or more pieces of equipment such as an audio receiver situated on the local network, a speaker, an appliance that need not necessarily act as a speaker (e.g. a digital video decoder box), etc.

Figure 1:
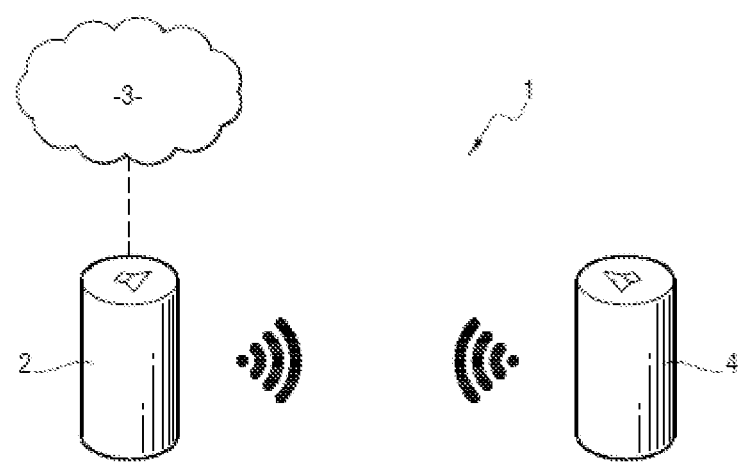
FIG. 1 shows a "cloud" streaming service and two smart-speakers.

The audio system 1 of FIG. 1 comprises a smartspeaker 2 that acquires an incoming audio stream from a streaming service 3 in the "cloud". The smartspeaker 2 reproduces one of the audio channels, and it is in charge of relaying the incoming audio stream, e.g. via a wireless link (Wi-Fi, Bluetooth, . . . ), to a second smartspeaker 4 that reproduces the other channel. The smartspeakers 2 and 4 are synchronized with each other by known means.

When the invention is not implemented, and when the smartspeakers 2 and 4 are configured for synchronized rendering of the same incoming audio stream, then each of them needs to apply equalization parameters to the incoming audio stream for reproduction. This means that each of the smartspeakers 2 and 4 needs to be capable of applying equalization.

In the present invention, there is an element that is considered as being the "master" element. This master element is in charge of applying the desired equalization parameters instead of it being applied by the various speakers.

The master element may be incorporated in the smartspeaker 2. The smartspeaker 2 then applies the equalization and the effects for its own playback channel, and also for the playback channel of the smartspeaker 4. Under such circumstances, the smartspeaker 4 can be a less sophisticated model, since it does not need to be capable of applying sound processing. The smartspeaker 2 is thus provided with a more powerful processor and/or with a digital signal processor (DSP), while the smartspeaker 4 could have a less powerful processor and/or no DSP, thereby reducing the cost of the smartspeaker 4.

Alternatively, the master element could be situated in the streaming service 3. The master element knows the model of the smartspeaker 2 and the model of the smartspeaker 4, and it applies the desired processing directly to the incoming audio stream for optimum reproduction in a stereo configuration reproduced by speakers of the same models as the smartspeakers 2 and 4. There is thus no need for the smartspeakers 2 and 4 themselves to apply processing to the sound signal, and both of them can thus be models that are simpler (and older and less expensive).

The invention is described below in greater detail.

Figure 2:
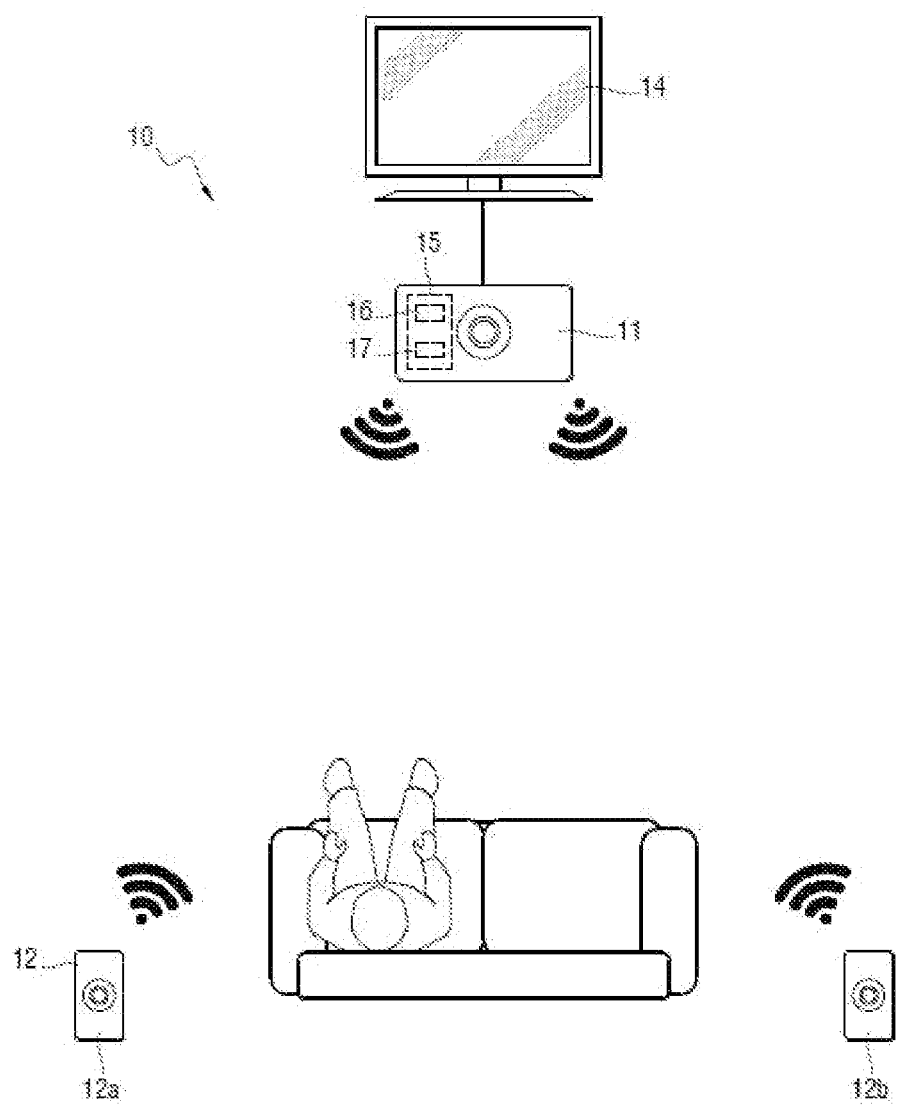
FIG. 2 shows a decoder box connected to a screen and two external speakers.

With reference to FIG. 2, an audio system 10 comprises a plurality of pieces of equipment, specifically a decoder box 11 and two external speakers 12: a left external speaker 12a and a right external speaker 12b stop The decoder box 11 is situated in front of a position provided for a user (and more or less facing the user), while the left external speaker 12a is situated behind and to the left of the user, and the right external speaker 12b is situated behind and to the right of the user.

The decoder box 11 has a video output connected to a screen 14.

The decoder box 11 also has communication means serving to connect it to the two external speakers 12. The communication means implements a wireless link, in this example using a Wi-Fi protocol. It should be observed that the link could be a wireless link of some other kind (e.g. a Bluetooth link), or indeed a wired link.

The plurality of pieces of equipment of the audio system 10 incorporate audio playback devices, each of which includes a loudspeaker, and the audio playback devices form a plurality of playback channels.

The "playback channels" are addressable audio outputs, each capable of receiving a respective audio signal dedicated to that output.

A mono external speaker is considered as a single playback channel. A stereo external speaker is considered as two playback channels.

In this example, each external speaker 12 has a single audio playback device including a loudspeaker. The audio playback device of the left external speaker 12a thus forms a (single) left playback channel and the audio playback device of the right external speaker 12b thus forms a (single) right playback channel.

In this example, the decoder box 11 also includes sound reproduction capabilities. This means that it has at least one audio playback device and thus at least one loudspeaker, and that it is capable at least of mono reproduction. The decoder box 11 may also be capable of reproducing a multichannel stream (e.g. such as a 5.1 stream), or even of reproducing a multichannel stream with elevation taken into account (e.g. such as a Dolby Atmos type stream with a 5.1.2 configuration).

In this example, the decoder box 11 is capable of reproducing a multichannel stream and it thus includes N (N>1) audio playback devices, each including a loudspeaker. The decoder box 11 is capable of sending a different signal to each of its N loudspeakers, such that it is considered that the N audio playback devices of the decoder box 11 form N playback channels, referred to herein as "front" playback channels.

The decoder box 11 also includes one or more processor components that provide a processor device 15 comprising a master element 16 and a configuration element 17. The processor components are adapted to execute instructions of a program in order to perform the steps of the processing method as described below. By way of example, the processor components comprise one or more components selected from the following components: a processor, a microcontroller, or a programmable logic circuit such as a field programmable gate array (FPGA) or an application-specific integrated circuit (ASIC).

The function of the master element 16 is described first.

The decoder box 11 acquires an incoming stream, which may be an audiovisual stream or else a stream that has audio components only.

The incoming stream may be an external incoming stream coming from an external source: a local network, a satellite, a cable, a digital video broadcasting-terrestrial (DVB-T) service, a digital access line (known as xDSL), etc. The incoming stream may also be an internal incoming stream coming from a source that is internal to the decoder box 11, e.g. from a hard disk drive (HDD).

The decoder box 11 extracts an incoming audio stream from the incoming stream: either the incoming audio stream is a stream that is separate and distinct so that extraction consists in acquiring only the incoming audio stream, or else the decoder box 11 performs demultiplexing in order to obtain the incoming audio stream.

The master element 16 acquires the incoming audio stream and applies processing adapted to each playback channel to the incoming audio stream so as to produce processed audio streams, each of which is adapted to a respective one of the playback channels. The master element 16 then transmits to the left external speaker 12a the processed audio stream that is dedicated thereto and to the right external speaker 12b the processed audio stream that is dedicated thereto.

Figure 3:
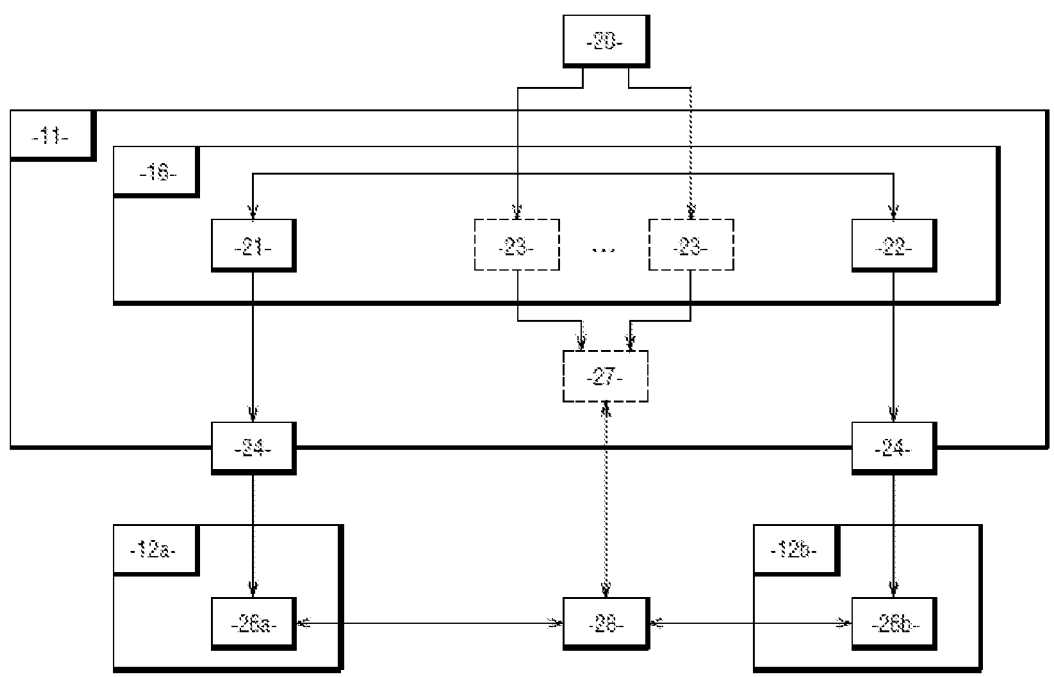
FIG. 3 shows the master element and two external speakers.

More precisely, with reference to FIG. 3, the master element 16 of the decoder box 11 acquires the incoming audio stream 20 and performs a plurality of processing sequences: a left processing sequence 21 adapted to the left playback channel (of the left external speaker 12a); a right processing sequence of 22 adapted to the right playback channel (of the right external speaker 12b); and N front processing sequences 23 adapted to the front playback channels (of the decoder box 11). Each of the processing sequences is associated with and adapted to a distinct respective playback channel.

Each processing sequence comprises a succession of a plurality of processes forming a "pipeline" of several stages.

The processing adapted to each playback channel and performed in each processing sequence comprises firstly, for each processing sequence, creating a particular audio stream is adapted to said playback channel. Creating particular audio streams consists in recalculating the target channels as a function of the source channels.

Each particular audio stream is then processed with its processing sequence and it is subjected to some or all of the following processes in order to produce the desired effects adapted to the associated playback channel: equalization, dynamic gain adjustment, relative volume adjustment, bass processing, etc. A processed audio stream is thus obtained from each particular audio stream.

By way of example, equalization consists in increasing the levels of low frequencies in the audio streams that are transmitted to the audio playback devices if they present limited performance at low frequencies. Dynamic adjustment may comprise adjustment both as a function of the level of the audio signal contained in the incoming audio stream and also as a function of audio characteristics in the audio playback devices.

The processed audio streams thus comprise a left processed audio stream adapted to the left playback channel, a right processed audio stream adapted to the right playback channel, and N front processed audio streams, each adapted to a respective one of the front playback channels.

The left and right processed audio streams are then encoded (e.g. using the Opus format) or else they are used without being encoded (as pulse code modulated (PCM) samples), and they are transmitted by the master element 16 respectively to the left external speaker 12a and to the right external speaker 12b (and thus to their respective audio playback devices).

Transmission makes use of the communication means 24 of the decoder box 11, which serve to connect the decoder box 11 to the left external speaker 12a and to the right external speaker 12b.

The master element 16 transmits the front processed audio streams internally within the decoder box 11 to the playback devices 27 of the decoder box 11.

The left external speaker 12a, the right external speaker 12b, and the decoder box 11 then proceed to deliver sound, and thus to play back the processed audio streams. For this purpose, the left smartspeaker 12a uses its playback device 26a, the right smartspeaker 12b uses its playback device 26b, and the decoder box 11 uses its playback devices 27.

Conventional synchronization means 28 are used to synchronize sound playback with the video playback performed by the decoder box 11 via the screen 14 so as to ensure matching reproduction of the image and of the sound.

In FIG. 3, it should be observed that the boxes 23 and 27 are drawn with dashed lines to illustrate the fact that the decoder box 11 could perfectly well incorporate the master element 16, but without possessing any audio playback capacity.

As mentioned above, the master element 16 produces processed audio streams, each of which is adapted to a respective one of the playback channels.

It should be ensured that the left external speaker 12a and the right external speaker 12b do not apply any unwanted processing (e.g. when they do not know the real spatial configuration), and in particular that they do not perform any processing that could mix the processed audio streams or that could modify the spatialization that is obtained as a result of the processing performed by the master element 16. The external speakers must not perform any processing that could affect channel separation, and they must not reproduce the processing that has already been performed by the master element 16.

The left and right processed audio streams are configured for this purpose by the master element 16.

Configuration of a processed audio stream may consist in associating a specific message or a dedicated command with the stream in order to tell the external speaker 12 not to "process" the sound. This is the most reliable technique, however it is not necessarily possible for it to be implemented: that command need not necessarily exist, in particular if the speakers were not originally designed for this specific use.

The processed audio stream may be configured by transmitting it in dual channel mode.

Dual channel mode generally presents semantics meaning that the contents of two channels (left/right) are independent and should not be mixed.

Dual channel mode is conventionally used for handling the situation in which playback channels having semantically different contents are conveyed simultaneously, even though they are not stereo channels. For example, this applies when a first channel contains speech in a first language while a second channel contains speech in a second language different from the first. Although these two channels are conveyed simultaneously, they are for taking into consideration differently from stereo transmission.

By way of example, dual channel mode is available in the following audio encoding formats MPEG-1 (ISO/IEC 11172-3), MPEG-2 (ISO/IEC 13818-3 and 13818-7), and SBC (used for encoding sound on Bluetooth in the AD2P).

Using dual channel mode makes it possible to ensure that two channels are transmitted independently: no audio signal mixing and no processing having an impact on spatialization is performed by the speakers and/or by decoders playing back such a stream (unlike stereo mode, for example).

Dual channel mode is thus diverted from its initial semantics and function in order to ensure that the sound channels are not subjected to any subsequent processing or to mixing that could affect the spatialization and/or the separation of the channels. Thus, it is possible to ensure that external speakers 12$a$ and 12$b$ receiving two playback channels do not apply any such additional processing.

An additional advantage of dual channel mode is that digital audio encoders, when configured in this mode, do not seek to make use of any redundancy between the channels in order to perform a compression step, which could affect separation between the channels. It is thus possible to ensure that any optional compression step that might be used the purpose of transmitting to the external speakers does indeed preserve full separation of the channels.

As a function of the desired configurations, the dual channel content may contain two different channels, or else the same channel twice over.

The configuration of the processed audio stream may also consist in transmitting in mono mode to each of the external speakers 12$a$ and 12$b$ in the external stereo pair, instead of transmitting a stereo stream to the speakers. Under such circumstances, each of the external speakers receives only the processed audio stream that is intended for that speaker, thereby avoiding any possibility of the speaker applying sound processing that affects the distribution of the audio channels and that could mix the processed audio streams or modify spatialization.

Using mono transmissions can be advantageous with a pair of external speakers capable of receiving either a stereo stream or else a mono stream for each speaker (i.e. two different mono streams), but not capable of receiving a dual channel stream and/or of processing it correctly.

The configuration of each processed audio stream may consist in transmitting it in stereo mode, with two channels conveying the same audio signal. The left channel and the right channel are identical. This configuration is referred to as "dual mono". Under such circumstances, each of the external speakers receives a stereo audio stream in which both channels are identical, said stream being intended for that speaker. This can be advantageous if the capabilities of the external speakers do not make it possible to use dual channel mode or to use mono mode. Under such circumstances, even if a speaker were to attempt to apply processing that could affect the separation of the channels, such processing would be ineffective since both channels are identical. The parameters of the processing sequences naturally depend on the spatial configuration of the various playback devices, but they also depend on the characteristics of those devices, in particular in terms of their sound rendering capabilities.

It should be recalled that the audio system 10 being described herein comprises the decoder box 11, which is capable of reproducing a multichannel sound, and also two rear external speakers 12.

If the external speakers 12 are speakers having poor sound reproduction capabilities at low frequencies (e.g. as often applies to speakers that are intended mainly for use with rear channels), then the channel that is dedicated to low frequencies (the "low-frequency effects" (LFE) channel) is reproduced by the bass loudspeaker of the decoder box 11.

Conversely, if the external speakers 12 are speakers of better quality, having good bass reproduction capability, it is desirable for them to reproduce the LFE channel instead of the decoder box 11 (which is of a physical volume that is more limited for reproducing low frequencies). Under such circumstances, the source signal channel is mixed with the rear channels in order to create the signals for the rear external speakers 12 so that the low frequencies are reproduced by those speakers.

By way of example, it is also possible that the decoder box 11, which has sound reproduction capabilities, is initially used on its own by the user, and that the user subsequently adds additional speakers, specifically the external speakers 12. The processing sequences implemented are naturally different when the decoder box 11 is used on its own (all of the source channels are then played back, after processing, by the decoder box 11), and when the decoder box 11 is used together with the pair of external speakers 12.

It is therefore necessary to configure the processing sequences: this is the function of the configuration element 17.

Figure 4:
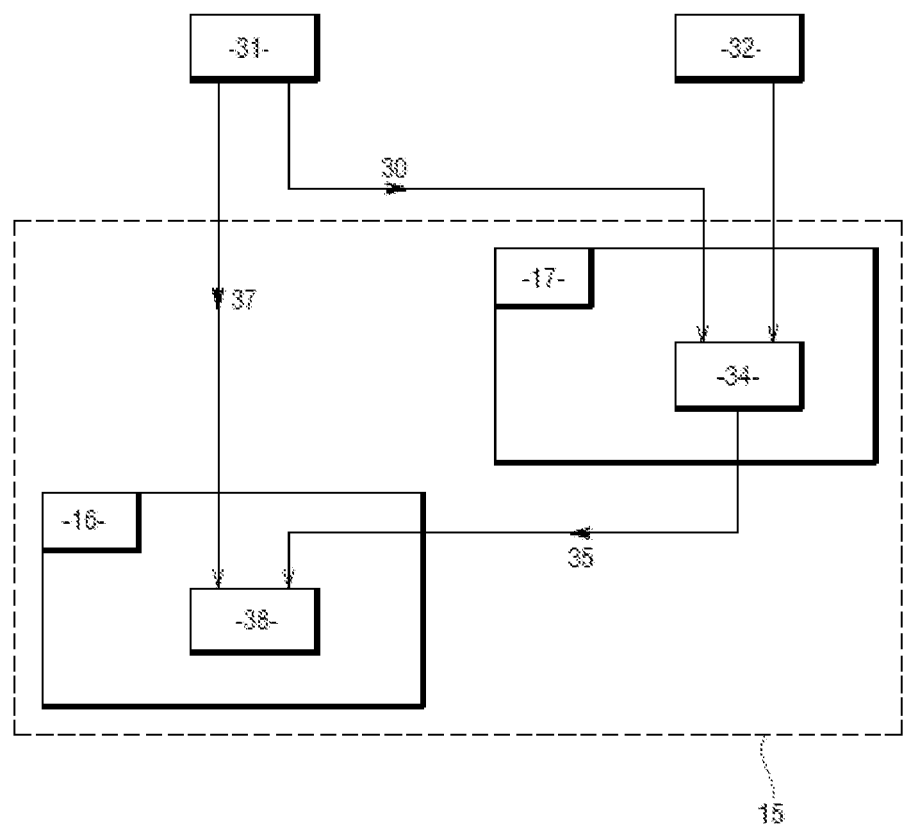
FIG. 4 shows the master element and the configuration element.

With reference to FIG. 4, the configuration element 17 acquires input parameters comprising both first characteristics 30 of the incoming audio stream 31 and also second characteristics 32 of the audio playback devices. Analysis means 34 of the configuration element 17 analyze the input parameters and produce configuration parameters 35 from the input parameters.

The first characteristics 30 of the incoming audio stream 31 comprise the number of source channels of the incoming audio stream 31 and a spatial configuration of the incoming audio stream 31.

The second characteristics 32 of the audio playback devices comprise playback information about the acoustic capabilities of the audio playback devices and about the spatial configuration of the playback channels.

The master element 16 then acquires the configuration parameters 35 in addition to the sound samples 37 of the incoming audio stream 31, and on the basis of the configuration parameters 35 it defines the various processing sequences 38. The configuration parameters 35 may comprise parameters that are used in the processing sequences 38. Alternatively, the configuration parameters 35 may specify the processing that is to be performed in the various processing sequences 38: it is then the configuration element 17 that selects the processing sequences 38, while it is the master element 16 that implements them.

The configuration element 17 may acquire the playback information associated with the audio playback devices of the external speakers 12 by means of dedicated messages issued by the external speakers 12. The configuration element 17 may also require the playback information associated with the audio playback devices of the external speakers 12 via an application programming interface (API) co-operating with a pre-filled database. The API serves to know the models of the external speakers 12, and the pre-filled database contains information about the speaker models. This information may also be obtained by the configuration element 17 from the master element 16, which provides information about the audio playback devices for which it manages the processing sequences.

In the above-described example, the entire processor device 15, i.e. the master element 16 and the configuration element 17, is incorporated in the same physical piece of equipment (specifically the decoder box 11).

That need not necessarily be true. The master element 16 and a configuration element 17 could be incorporated in two different physical pieces of equipment. The audio system could have two distinct pieces of equipment comprising a master piece of equipment in which the master element 16 is implemented and a configuration piece of equipment in which the configuration element 17 is implemented.

For example, the configuration element 17 could be incorporated in a decoder box (which is then the configuration equipment), and the master element 16 could be incorporated in an external smartspeaker having sufficient processing capabilities (the smartspeaker is then the master equipment). This reduces the processing load on the decoder box.

It is also possible for the master element 16 to be spread over a plurality of pieces of equipment. There would then be a plurality of master elements 16. There would thus be at least two distinct pieces of equipment comprising at least two master pieces of equipment, with a master element 16 being implemented in each of them.

Figure 5:
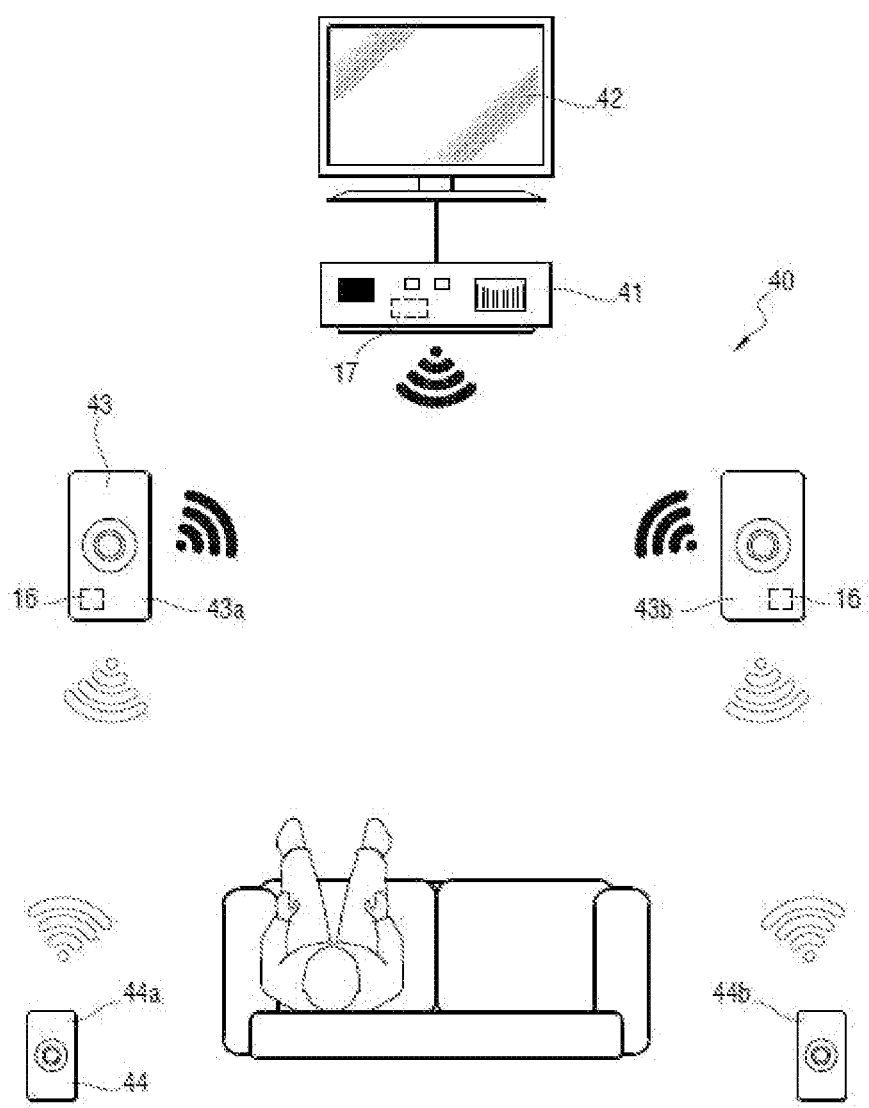
FIG. 5 shows a decoder box connected to a screen, and four external speakers.

With reference to FIG. 5, the audio system 40 comprises a decoder box 41 connected to a screen 42, together with two smartspeakers 43 and two auxiliary speakers 44.

The decoder box 41 does not have an audio playback device (and thus does not have a loudspeaker), and it has modest processing capability.

The decoder box 41 is connected by Wi-Fi to a left smartspeaker 43a and to a right smartspeaker 43b, which act as front channels. The left smartspeaker 43a is connected by Bluetooth to a left auxiliary speaker 44a. The right smartspeaker 43b is connected by Bluetooth to a right auxiliary speaker 44b. The left and right auxiliary speakers 44a and 44b act as rear channels.

In this example, the configuration element 17 is situated in the decoder box 41. The two smartspeakers 43 perform the master element function, thereby reducing the processing load on the decoder box 41. The two smartspeakers 43 are thus two master pieces of equipment.

The left smartspeaker 43a thus takes charge of the processing sequences for the two left speakers, i.e. for the left smartspeaker 43a and for the left auxiliary speaker 44a. The right smartspeaker 43b thus takes charge of the processing sequences for the two right speakers, i.e. for the right smartspeaker 43b and for the right auxiliary speaker 44b.

The speakers are synchronized with one another by known means, in this example using different protocols.

Figure 6:
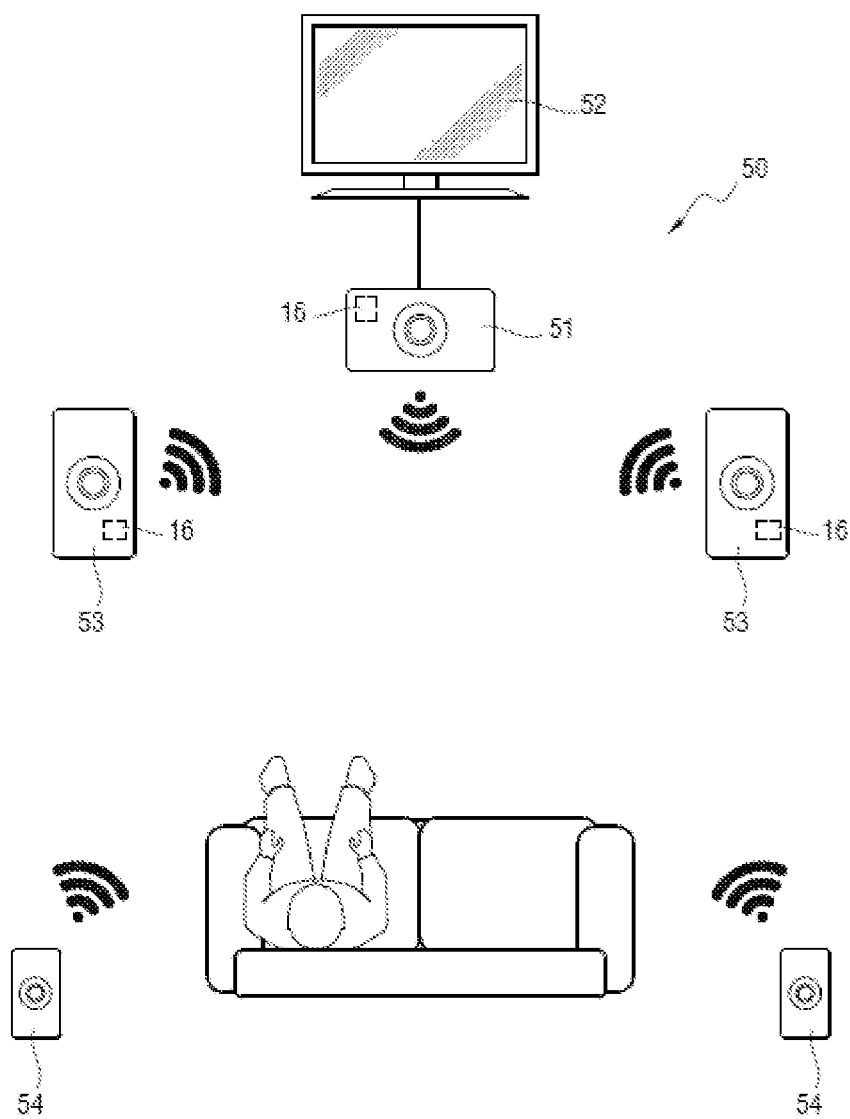
FIG. 6 shows a decoder box connected to a screen, and four external speakers.

With reference to FIG. 6, an audio system 50 comprises a decoder box 51 connected to a screen 52, two smartspeakers 53 and two smartspeakers 54.

The decoder box 51 is provided with loudspeakers and it receives the incoming audio stream. The decoder box 51 is connected by Wi-Fi to the two smartspeakers 53 acting as front channels. The two smartspeakers 53 have advanced processing capabilities. The decoder box 51 is also connected by Wi-Fi to the other two smartspeakers 54 acting as rear channels, and having only modest processing capabilities.

In this configuration, the decoder box 51 manages the processing sequences for itself and for the smartspeakers 54, while each of the smartspeakers 53 manages its own processing sequence. In this manner, the processing resources of the decoder box 51 are preserved as much as possible, so as to be available optionally for other uses (e.g. for implementing an advanced graphics interface).

In this configuration there are thus three master elements 16, each processing a portion of the playback channels. The three master pieces of equipment are the decoder box 51 and the two smartspeakers 53.

Naturally, the invention is not limited to the embodiment described, but covers any variant coming within the ambit of the invention as defined by the claims.

The invention claimed is:

1. A processor device for processing an incoming audio stream, the processor device being arranged to be incorporated in an audio system comprising a plurality of pieces of equipment incorporating audio playback devices, each comprising a loudspeaker, the audio playback devices being arranged to form a plurality of playback channels, and the processor device comprising:
   a configuration element arranged to acquire input parameters comprising both first characteristics of the incoming audio stream and also second characteristics of the audio playback devices, and to produce configuration parameters on the basis of the input parameters;
   a master element arranged to acquire the incoming audio stream together with the configuration parameters, to define processing sequences from the configuration parameters, each processing sequence being associated with and adapted to a respective playback channel, to apply the processing sequences to the incoming audio stream so as to produce processed audio streams, each adapted to a respective one of the playback channels and defining spatialization, and to transmit to each piece of equipment comprising an audio playback device the processed audio stream that is adapted to the playback channel associated with said audio playback device,
   wherein configuring each processed audio stream consists of:
      transmitting the processed audio stream in dual channel mode, the processed audio stream being in a format in which the dual channel mode is available; or
      transmitting the processed audio stream in stereo mode, with two channels conveying a same audio signal.

2. The processor device according to claim 1, wherein configuring each processed audio stream consists in associating it with a specific message or with a dedicated command.

3. The processor device according to claim 1, wherein configuring each processed audio stream consists in transmitting it in mono mode.

4. The processor device according to claim 1, wherein configuring each processed audio stream consists in transmitting it in dual channel mode.

5. The processor device according to claim 1, wherein configuring each processed audio stream consists in transmitting it in stereo mode, with two channels conveying the same audio signal.

6. The processor device according to claim 1, wherein the processing sequence associated with and adapted to a playback channel performs processing that comprises creating a particular audio stream adapted to said playback channel, and/or applying equalization and/or dynamic gain adjustment and/or relative volume adjustment to that particular audio stream in order to produce the processed audio stream adapted to said playback channel.

7. The processor device according to claim 1, wherein the first characteristics of the incoming audio stream comprise a number of source channels of the incoming audio stream and a spatial configuration of the incoming audio stream.

8. The processor device according to claim 1, wherein the second characteristics of the audio playback devices comprise playback information about the acoustic capabilities of the audio playback devices and about the spatial configuration of the playback channels.

9. The processor device according to claim 8, wherein the playback information is acquired by the configuration element via an application programming interface co-operating with a pre-filled database, or by receiving dedicated messages issued by the pieces of equipment incorporating said audio playback devices, or else transmitted to the configuration element by the master element.

10. Equipment including a processor device according to claim 1.

11. The equipment according to claim 10, the equipment being a decoder box.

12. An audio system comprising a plurality of pieces of equipment incorporating audio playback devices, each comprising a loudspeaker, the audio system including a processor device according to claim 1, which device is implemented by at least two distinct pieces of equipment.

13. The audio system according to claim 12, wherein the at least two distinct pieces of equipment comprise a master equipment in which the master element is implemented and a configuration equipment in which the configuration element is implemented.

14. The audio system according to claim 12, wherein the at least two distinct pieces of equipment comprise at least two master pieces of equipment, with a respective master element being implemented in each of them.

15. A processing method implemented in a processor device according to claim 1, and comprising the steps of:
    acquiring input parameters comprising both first characteristics of the incoming audio stream and also second characteristics of the audio playback devices, and producing configuration parameters on the basis of the input parameters;
    acquiring the incoming audio stream together with the configuration parameters, defining processing sequences from the configuration parameters, each processing sequence being associated with and adapted to a respective playback channel, applying the processing sequences to the incoming audio stream so as to produce processed audio streams, each adapted to a respective one of the playback channels, and transmitting to each piece of equipment comprising an audio playback device the processed audio stream that is adapted to the playback channel associated with said audio playback device.

16. A non-transitory computer readable storage medium having stored thereon a computer program including instructions for causing the processor device according to claim 1 to execute a processing method comprising the steps of:
    acquiring input parameters comprising both first characteristics of the incoming audio stream and also second characteristics of the audio playback devices, and producing configuration parameters on the basis of the input parameters;
    acquiring the incoming audio stream together with the configuration parameters, defining processing sequences from the configuration parameters, each processing sequence being associated with and adapted to a respective playback channel, applying the processing sequences to the incoming audio stream so as to produce processed audio streams, each adapted to a respective one of the playback channels, and transmitting to each piece of equipment comprising an audio playback device the processed audio stream that is adapted to the playback channel associated with said audio playback device.

* * * * *